US012185071B2

(12) United States Patent
Yamaoka

(10) Patent No.: US 12,185,071 B2
(45) Date of Patent: Dec. 31, 2024

(54) SYNCHRONIZING SOUND WITH POSITION OF SOUND SOURCE IN IMAGE

(71) Applicant: Sony Group Corporation, Tokyo (JP)

(72) Inventor: Daisuke Yamaoka, Kanagawa (JP)

(73) Assignee: Sony Group Corporation (JP)

(*) Notice: Subject to any disclaimer, the term of this patent is extended or adjusted under 35 U.S.C. 154(b) by 28 days.

(21) Appl. No.: 17/602,503

(22) PCT Filed: Mar. 27, 2020

(86) PCT No.: PCT/JP2020/014399
§ 371 (c)(1),
(2) Date: Oct. 8, 2021

(87) PCT Pub. No.: WO2020/213375
PCT Pub. Date: Oct. 22, 2020

(65) Prior Publication Data
US 2022/0217469 A1 Jul. 7, 2022

(30) Foreign Application Priority Data
Apr. 16, 2019 (JP) ................................ 2019-077559

(51) Int. Cl.
*H04R 3/04* (2006.01)
*H04R 5/02* (2006.01)
*H04R 5/04* (2006.01)

(52) U.S. Cl.
CPC ................ *H04R 5/04* (2013.01); *H04R 3/04* (2013.01); *H04R 5/02* (2013.01); *H04R 2499/15* (2013.01)

(58) Field of Classification Search
None
See application file for complete search history.

(56) References Cited

U.S. PATENT DOCUMENTS 5,291,556 A 3/1994 Gale
5,930,376 A * 7/1999 Markow .............. G06F 1/1616 381/337
9,843,881 B1 * 12/2017 Oates, III ................ H04R 5/02
2002/0034307 A1 3/2002 Kubota
2003/0053680 A1 3/2003 Lin
2006/0291665 A1 12/2006 Tsuiki
(Continued)

FOREIGN PATENT DOCUMENTS

CN 1201181 A 12/1998
CN 101330585 A 12/2008
(Continued)

OTHER PUBLICATIONS

International Search Report for Application No. PCT/JP2020/014399 mailed Jun. 23, 2020, pp. 1-4.
(Continued)

*Primary Examiner* — James K Mooney
(74) *Attorney, Agent, or Firm* — Lerner David LLP

(57) ABSTRACT

A display device includes: a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit.

11 Claims, 7 Drawing Sheets

(56) References Cited

U.S. PATENT DOCUMENTS

| | | | | | |
|---|---|---|---|---|---|
| 2007/0104341 | A1 | 5/2007 | Kondo | | |
| 2010/0119092 | A1* | 5/2010 | Kim | H04R 3/12 381/306 | |
| 2011/0025927 | A1* | 2/2011 | Yana | H04R 5/02 348/739 | |
| 2015/0117686 | A1* | 4/2015 | Kim | H04R 1/403 381/306 | |
| 2018/0198052 | A1 | 7/2018 | Park | | |
| 2018/0332376 | A1* | 11/2018 | Lee | H04R 7/045 | |
| 2020/0107115 | A1* | 4/2020 | Son | H04R 1/22 | |

FOREIGN PATENT DOCUMENTS

| | | | |
|---|---|---|---|
| CN | 101459797 | A | 6/2009 |
| CN | 101674505 | A | 3/2010 |
| CN | 103650535 | A | 3/2014 |
| CN | 105191349 | A | 12/2015 |
| CN | 106792287 | A | 5/2017 |
| CN | 108235193 | A | 6/2018 |
| CN | 108462917 | A | 8/2018 |
| CN | 108616788 | A | 10/2018 |
| CN | 108877597 | A | 11/2018 |
| EP | 0426272 | B1 | 7/1996 |
| JP | 2004187288 | A | 7/2004 |
| JP | 2005278125 | A | 10/2005 |
| JP | 2007110583 | A | 4/2007 |
| JP | 2007134939 | A | 5/2007 |
| JP | 2007274061 | A | 10/2007 |
| JP | 2008109209 | A | 5/2008 |
| JP | 2008131515 | A | 6/2008 |
| JP | 2010041579 | A | 2/2010 |
| JP | 2010206265 | A | 9/2010 |
| JP | 2012235426 | A | 11/2012 |
| KR | 20140141370 | A | 12/2014 |
| WO | 2012029790 | A1 | 3/2012 |
| WO | 2013105413 | A1 | 7/2013 |
| WO | 2018123310 | A1 | 7/2018 |

OTHER PUBLICATIONS

Zaili Yang et al., "Introduction to the Basic of Broadcast Technology", University of Electronic Science and Technology Press, published on Nov. 2014, pp. 73-76.

* cited by examiner

SYNCHRONIZING SOUND WITH POSITION OF SOUND SOURCE IN IMAGE

CROSS-REFERENCE TO RELATED APPLICATIONS

This application is a national phase entry under 35 U.S.C. § 371 of International Application No. PCT/JP2020/014399 filed Mar. 27, 2020, which claims the priority from Japanese Patent Application No. 2019-077559 filed in the Japanese Patent Office on Apr. 16, 2019, the entire contents of which are hereby incorporated by reference.

FIELD

The present disclosure relates to a display device, a control method, and a program.

BACKGROUND

In recent years, a display device such as a television receiver or a personal computer includes a display having a display surface on which an image is displayed, and speakers or the like are disposed on a rear side of the display and covered with a rear cover from the rear side. Such a display device has a configuration in which the speaker is disposed on the rear side of a lower end of the display, slits functioning as a passing hole of a voice output from the speaker are disposed on a lower side of the display, and the voice output from the speaker is directed forward from the slits through the lower side of the display.

In addition, as disclosed in the following Patent Literature 1, thickness and weight of the display has been rapidly reduced, a flat panel speaker including a flat panel and a plurality of vibrators disposed on a rear surface of the flat panel and vibrating the flat panel has been also proposed. The flat panel speaker allows the vibrators to generate vibration on the flat panel to output the voice.

CITATION LIST

Patent Literature

Patent Literature 1: WO 2018/123310 A

SUMMARY

Technical Problem

However, in any conventional speaker-mounted display device, two speakers LR are provided only on a lower end of or both ends of a rear surface of the display device, and it is thus difficult to make a position of an image and a position of a sound sufficiently correspond to each other.

Solution to Problem

According to the present disclosure, a display device is provided that includes: a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit.

According to the present disclosure, a control method, by a processor including a control unit, is provided that includes: specifying a sound source position from an image displayed on a display unit, and performing different types of signal processing on a voice signal synchronized with the image according to the sound source position, the voice signal being output to a plurality of sets of speaker units, the plurality of sets of speaker units including at least one set of speaker units provided on an upper portion of the display unit.

According to the present disclosure, a program is provided that causes a computer to function as: a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit.

DESCRIPTION OF EMBODIMENTS

Hereinafter, preferred embodiments of the present disclosure will be described in detail with reference to the accompanying drawings. Note that, in the present specification and the drawings, components that have substantially the same function are denoted with the same reference signs, and repeated explanation of these components will be omitted.

Further, the description will be given in the following order.

1. Configuration Example of Display Device
2. Example
2-1. First Example 2-2. Second Example
2-3. Third Example
2-4. Fourth Example
3. Conclusion Hereinafter, modes for implementing a display device according to the present disclosure will be described with reference to the accompanying drawings. Although application of the present technology to a television receiver that displays an image on a display will be described below, the application range of the present technology is not limited to the television receiver, and the present technology can be widely applied to various display devices such as monitors used for a personal computer and the like.

Further, in the following description, front, rear, upper, lower, left, and right directions will be represented with a direction in which a display surface of the display device (a television receiver) faces as a front side (a front surface side).

1. CONFIGURATION EXAMPLE OF DISPLAY DEVICE

Figure 1:
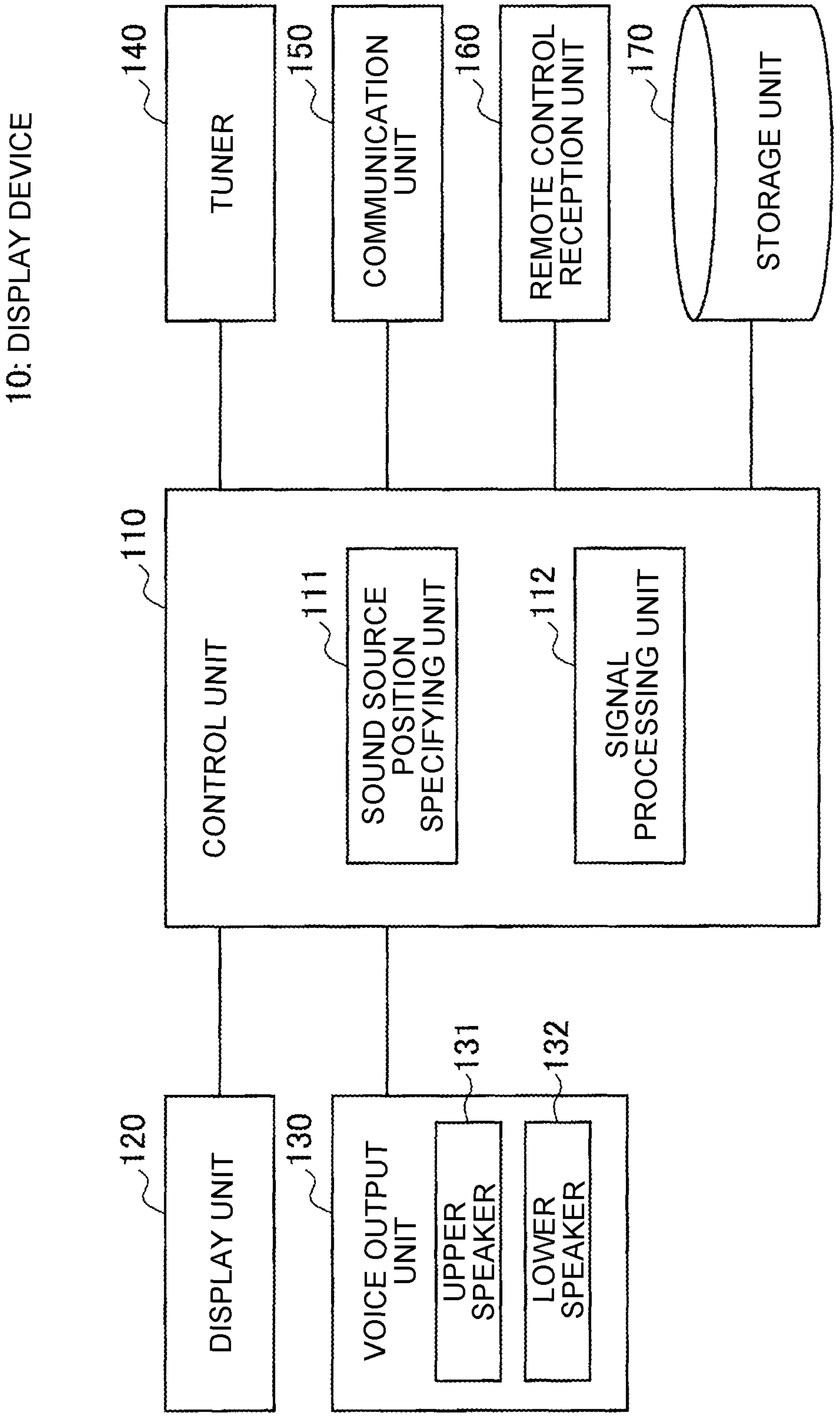
FIG. 1 is a diagram illustrating a configuration example of a display device according to an embodiment of the present disclosure.

FIG. 1 is a diagram illustrating a configuration example of a display device according to an embodiment of the present disclosure. As illustrated in FIG. 1, a display device 10 includes a control unit 110, a display unit 120, a voice output unit 130, a tuner 140, a communication unit 150, a remote control reception unit 160, and a storage unit 170.

(Display Unit 120)

The display unit 120 displays an image of a program content selected and received by the tuner 140, an electronic program guide (EPG), and data broadcast content, and displays an on-screen display (OSD). The display unit 120 is realized by, for example, a liquid crystal display (LCD), an organic electro luminescence (EL) display, or the like. In addition, the display unit 120 may be realized by a flat panel speaker. The flat panel speaker allows a plurality of vibrators provided on a rear surface of the flat panel to generate vibration on a flat panel to output a voice, and is integrated with a display device that displays an image to output the voice from a display surface. For example, a panel unit includes a thin plate display cell that displays an image (a display cell as a vibration plate), and an inner plate (substrate supporting vibrators) disposed to face the display cell with a gap interposed therebetween.

(Voice Output Unit 130)

The voice output unit 130 includes an acoustic generating element that reproduces a voice signal. As the voice output unit 130, the above-described flat panel speaker (the vibration plate (the display unit) and the vibrator) may be used, in addition to a cone-type speaker.

Figure 2:
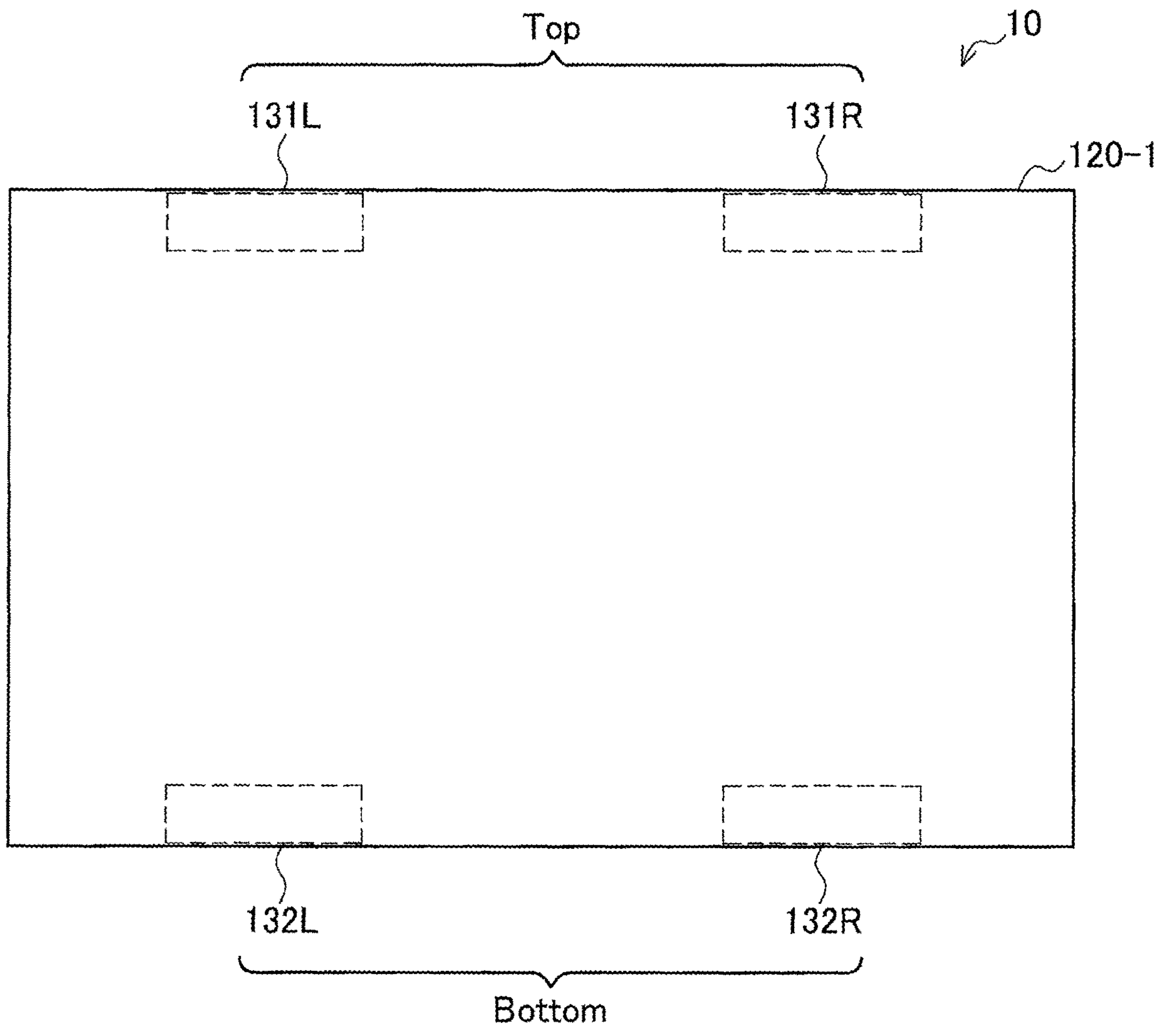
FIG. 2 is a view illustrating disposition of speakers in the display device according to an embodiment of the present disclosure.

Furthermore, the voice output unit 130 includes a plurality of sets of speaker units including at least one set of speaker units provided on an upper end side of a rear side of the display unit 120. The speaker unit refers to a speaker housing including at least one acoustic generating element that reproduces a voice signal. In the configuration example illustrated in FIG. 1, for example, a configuration is made in which a set of speaker units (hereinafter, referred to as an upper speaker 131) provided on the upper end side of the rear side of the display unit 120 and a set of speaker units (hereinafter, referred to as a lower speaker 132) provided on a lower end side of the rear side of the display unit 120. FIG. 2 illustrates an example of disposition of speakers in the display device 10 according to the present embodiment. In the example illustrated in FIG. 2, a plurality of acoustic generating elements (including a cone-type speaker, for example) emitting acoustic waves are provided on a rear surface of a display unit 120-1.

Specifically, as illustrated in FIG. 2, an upper speaker (a speaker unit) 131L is disposed more to the left of the upper end side (Top), and an upper speaker (a speaker unit) 131R is disposed more to the right of the upper end side, when the display unit 120-1 is viewed from the front. In addition, a lower speaker (a speaker unit) 132L is disposed more to the left of the lower end side (Bottom), and a lower speaker (a speaker unit) 132R is disposed more to the right of the lower end side.

Figure 3:
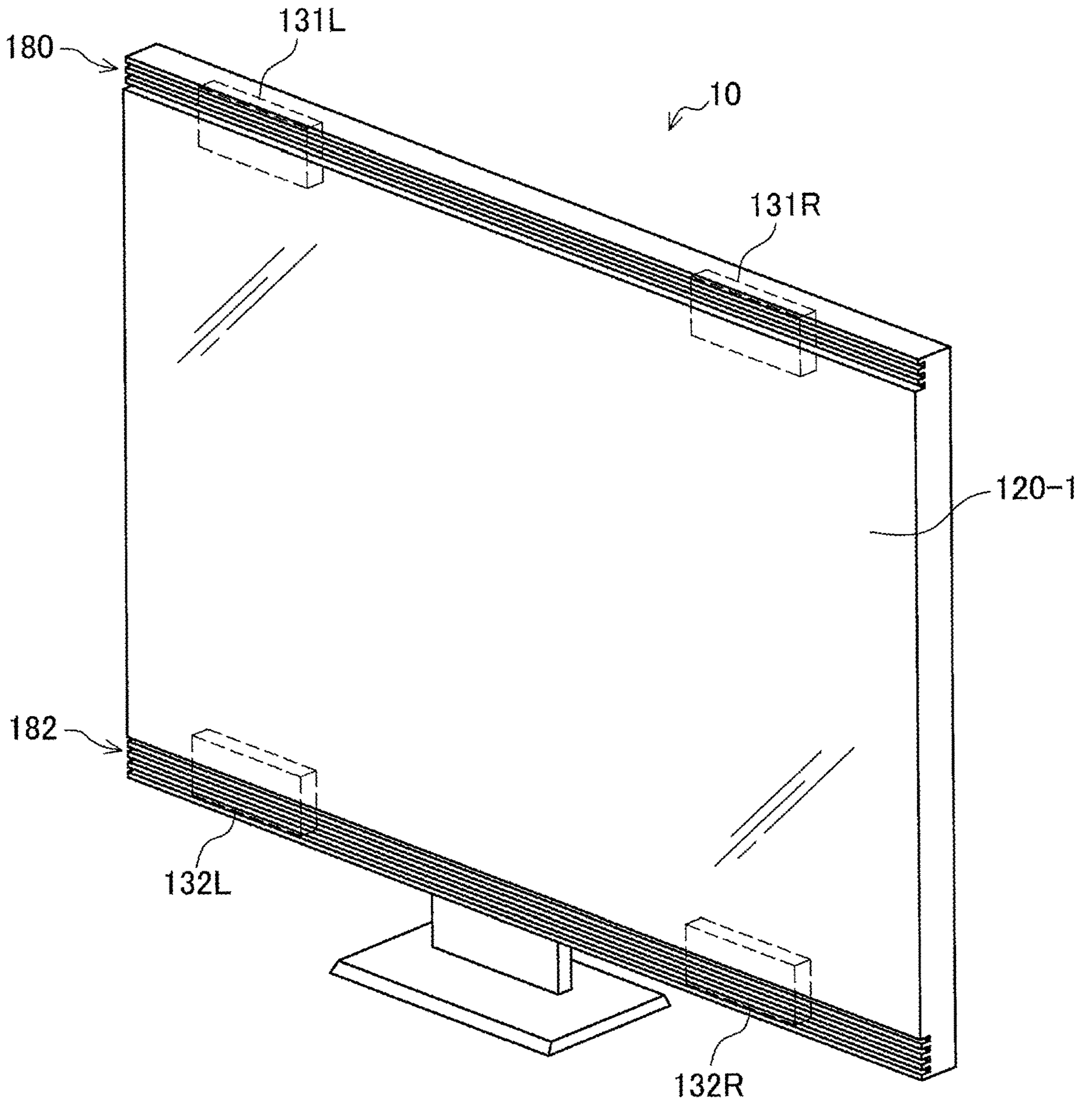
FIG. 3 is a view illustrating a configuration example of an appearance of the display device that emits acoustic waves in a forward direction according to an embodiment of the present disclosure.

Further, in more detail, a voice passing hole (not illustrated) is formed around the speaker unit, and acoustic waves generated in the speaker unit are emitted to the outside of the display device 10 through the voice passing hole. An emitting direction of the acoustic wave in the display device 10 can be emitted up, down, left, and right according to a position of the voice passing hole. For example, in the present embodiment, the voice passing hole is provided to emit the acoustic waves in a forward direction. Here, FIG. 3 illustrates a configuration example of an appearance of the display device that emits the acoustic waves in the forward direction according to the present embodiment. Note that the appearance configuration (the emitting direction of acoustic waves or a structure around the voice passing hole) illustrated in FIG. 3 is an example, and the present disclosure is not limited thereto.

As illustrated in FIG. 3, in the display device 10, the upper speaker 131L is disposed more to the left of the upper side of the rear surface of the display unit 120-1, the upper speaker 131R is disposed more to the right of the upper side of the rear surface, the lower speaker 132L is disposed more to the left of the lower side of the rear surface, and the upper speaker 131R is disposed more to the right of the lower side of the rear surface. A part of the upper speakers 131 is preferably located on the upper side of the display unit 120-1 (so that all the upper speakers 131 are not located on the upper side of the display). In addition, a part of the lower speakers 132 is preferably located on the lower side of the display unit 120-1 (so that all the lower speakers 132 are not located on the lower side of the display unit 120-1). Since a part of the speaker units is provided to protrude from the display unit 120-1, and the acoustic waves are emitted to the outside in the forward direction, even when a sound with a high frequency is generated from the speaker, the sound can be output to the outside of the display device 10 without deteriorating a sound quality. In addition, since all the speaker units are not located on the upper side or the lower side of the display unit 120-1, a size of a frame of the display device 10 can be further reduced.

A voice is output forward from each upper speaker 131. A slit 180 functioning as a voice passing hole is provided in an upper frame of the display unit 120-1, and the voice emitted from the upper speaker 131 is emitted to the outside of the display device 10 via the slit 180.

Similarly, the voice is also output forward from each lower speaker 132. A slit 182 functioning as a voice passing hole is provided in a lower frame of the display unit 120-1, and the voice emitted from the upper speaker 131 is emitted to the outside of the display device 10 via the slit 182.

The acoustic waves of respective voices output from the upper speakers 131 and the lower speakers 132 reach a viewer viewing the display device 10 as direct waves, and also reach the viewer as reflected waves from a wall surface, a ceiling, or a floor surface.

In the present embodiment, with the configuration including the plurality of sets of speaker units including at least one set of speaker units provided on the upper end side, the voice signal output from each speaker unit is subjected to signal processing, and a position of an image and a position of a sound are made to sufficiently correspond to each other. Thus, a sense of unity between an image and a sound is provided, and a good viewing state can be realized.

(Control Unit 110)

The control unit 110 functions as an arithmetic processing device and a control device, and controls the overall operation of the display device 10 according to various programs. The control unit 110 is realized by, for example, an electronic circuit such as a central processing unit (CPU) or a microprocessor. In addition, the control unit 110 may include a read only memory (ROM) that stores programs, operation parameters, and the like to be used, and a random access memory (RAM) that temporarily stores parameters and the like that change appropriately.

Furthermore, the control unit 110 also functions as a sound source position specifying unit 111 and a signal processing unit 112.

The sound source position specifying unit 111 analyzes an image displayed on the display unit 120 and specifies a sound source position. Specifically, the sound source position specifying unit 111 identifies each object included in the image (recognizes an image such as a person and an object), and recognizes movement (for example, movement of the mouth) of each identified object, a position (xy coordinates) of each object in the image, and the like, and specifies the sound source position. For example, when it is analyzed that the mouth of a person is moving by image recognition in a certain scene, a voice of the person is reproduced in synchronization with the scene, and the mouth (a face position) of the person who is recognized in the image is a sound source position. Depending on a result of the image analysis, the sound source position may be the entire screen. In addition, there is a case where the sound source position is not in the screen, but in this case, the outside of the screen may be specified as the sound source position.

The signal processing unit 112 has a function of processing a voice signal to be output to the voice output unit 130. Specifically, the signal processing unit 112 performs signal processing of causing a sound image to be localized at the sound source position specified by the sound source position specifying unit 111. More specifically, pseudo sound source localization is realized by performing at least one of adjustments of a sound range, a sound pressure, and a delay on each voice signal to be output to each speaker of the plurality of sets of speaker units including at least one set of speaker units provided on the upper end side of the rear side of the display unit 120. Generally, when the person hears sounds emitted from a plurality of speakers, human ears perceive, as a direction of a sound source, a direction of a sound that is louder, is high frequency, and reaches the human ears earlier to recognize the direction as one sound. Therefore, the signal processing unit 112 realizes pseudo sound source localization by processing the voice output from the speaker that is disposed closest to the sound source position in the image according to the positional relationship between the sound source position in the image and an installation position of each speaker so as to make the voice be in a high frequency sound range, increase a volume (increase a sound pressure), and reduce the delay (cause the voice to reach the viewer's ear earlier than the voice from the other speakers) as compared with those of the voice output from the other speaker.

When the sound source position in the image has the same distance between two speakers, the signal processing unit 112 processes the voice output from the two speakers so as to make the voice be in a high frequency sound range, increase a volume (increase a sound pressure), and reduce the delay (cause the voice to reach the viewer's ear earlier than that of the voice from the other speakers) as compared with those of the voice output from the other speaker.

Figure 4:
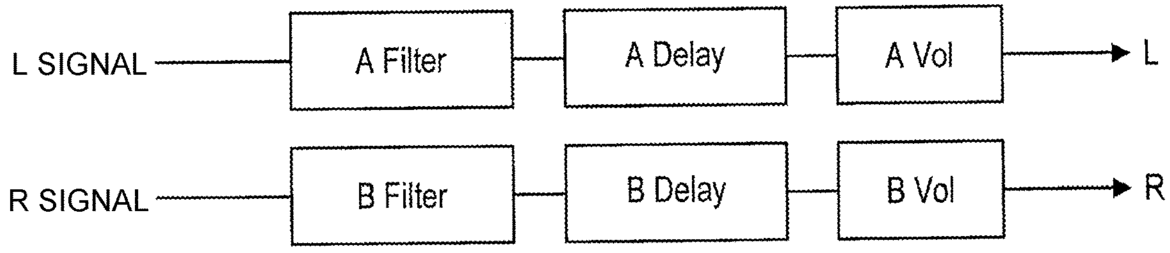
FIG. 4 is a diagram illustrating signal processing according to a comparative example.
Figure 5:
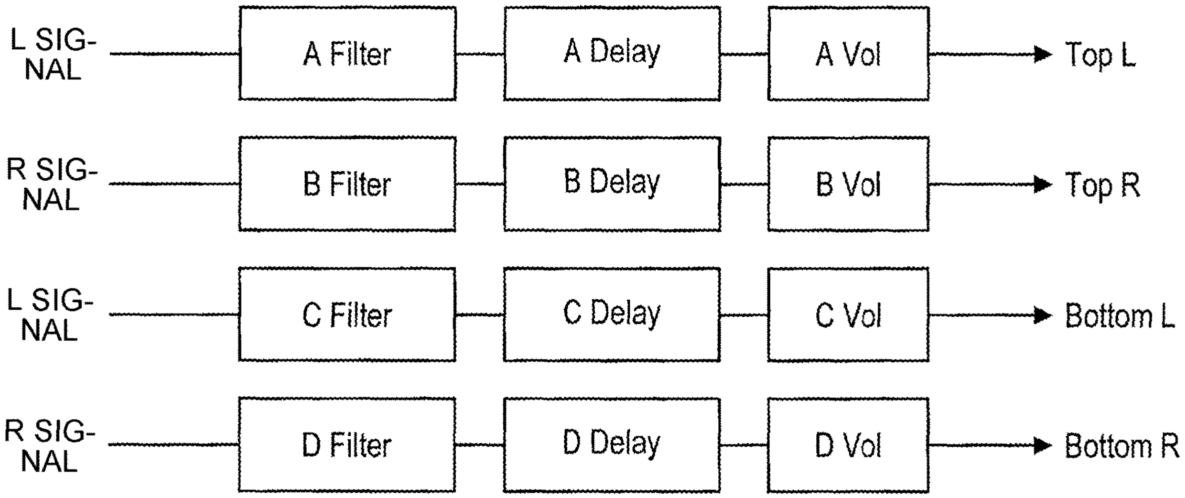
FIG. 5 is a diagram illustrating each processing of a voice signal to be output to each speaker according to an embodiment of the present disclosure.

In a comparative example in which two speakers are separately provided in left and right of the display unit, as illustrated in FIG. 4, the voice signal (L signal) of a left channel can be subjected to signal processing and be output to the L speaker, and the voice signal (R signal) of a right channel can be subjected to signal processing and be output to the R speaker. On the other hand, in the present embodiment, as illustrated in FIG. 5, different types of signal processing can be performed on a voice signal (L signal) to be output to the speaker of Top L (the upper speaker 131L), a voice signal (R signal) to be output to the speaker of Top R (the upper speaker 131R), a voice signal (L signal) to be output to the speaker of Bottom L (the lower speaker 132L), and a voice signal (R signal) to be output to the speaker of Bottom R (the lower speaker 132R). In each signal processing, at least one of an adjustment of the sound range by a filter (a correction curve may be used), delay processing, and a volume adjustment (that is, a sound pressure adjustment) is performed according to a positional relationship between the specified sound source position and each speaker.

Furthermore, the signal processing unit 112 may perform the signal processing (particularly, the adjustment of the sound range) in consideration of characteristics of each speaker. The characteristics of each speaker are function (specification) characteristics (including frequency characteristics and the like) and environmental characteristics (disposition), and these characteristics may be different for each speaker. For example, as illustrated in FIG. 3, there may be an environmental difference between the upper speakers 131 disposed on the upper side and the lower speakers 132 disposed on the lower side, such as a reflected sound assumed as a sound emitted (reflected from ceiling and reflected from a floor surface (a television stand)), a sound reaching the viewer from above, or a sound reaching the viewer from below. In addition, there may also be a difference in a structural environment around the speaker unit, such as how much each speaker protrudes from the display unit 120-1 and how many slits are on the display unit 120-1. Furthermore, specifications of the speaker units may be different. In consideration of the characteristics, the signal processing unit 112 prepares and applies a correction curve for localization of the sound source to a predetermined sound source position in a pseudo manner for each voice signal to be output to each speaker. The correction curve may be generated each time or may be generated in advance.

(Tuner 140)

The tuner 140 selects and receives broadcast signals of terrestrial broadcasting and satellite broadcasting.

(Communication Unit 150)

The communication unit 150 is connected to an external network such as the Internet by using wired communication such as Ethernet (registered trademark) or wireless communication such as Wi-Fi (registered trademark). For example, the communication unit 150 may be interconnected with each CE device in a home via a home network in accordance with a standard such as digital living network alliance (DLNA, registered trademark), or may further include an interface function with an IoT device.

(Remote Control Reception Unit 160)

The remote control reception unit 160 receives a remote control command transmitted from a remote controller (not illustrated) using infrared communication, near field wireless communication, or the like.

(Storage Unit 170)

The storage unit 170 may be realized by a read only memory (ROM) that stores programs, operation parameters, and the like to be used for processing of the control unit 110, and a random access memory (RAM) that temporarily stores parameters and the like that change appropriately. In addition, the storage unit 170 includes a large-capacity recording device such as a hard disk drive (HDD), and is mainly used for recording content received by the tuner 140. Note that a storage device externally connected to the display device 10 via an interface such as a high-definition multimedia interface (HDMI, registered trademark) or universal serial bus (USB) may be used.

The configuration of the display device 10 has been specifically described above. Note that the configuration of the display device 10 according to the present disclosure is not limited to the example illustrated in FIG. 1. For example, at least a part of the functional configuration of the control unit 110 may be provided in an external device (for example, an information processing device communicably connected to the display device 10, a server on a network, or the like). In addition, a system configuration may be employed in which the display unit 120 and the voice output unit 130, and the control unit 110 are configured as separate units, and are communicably connected.

2. EXAMPLE

Next, examples of the present embodiment will be specifically described with reference to the drawings.

2-1. First Example

Figure 6:
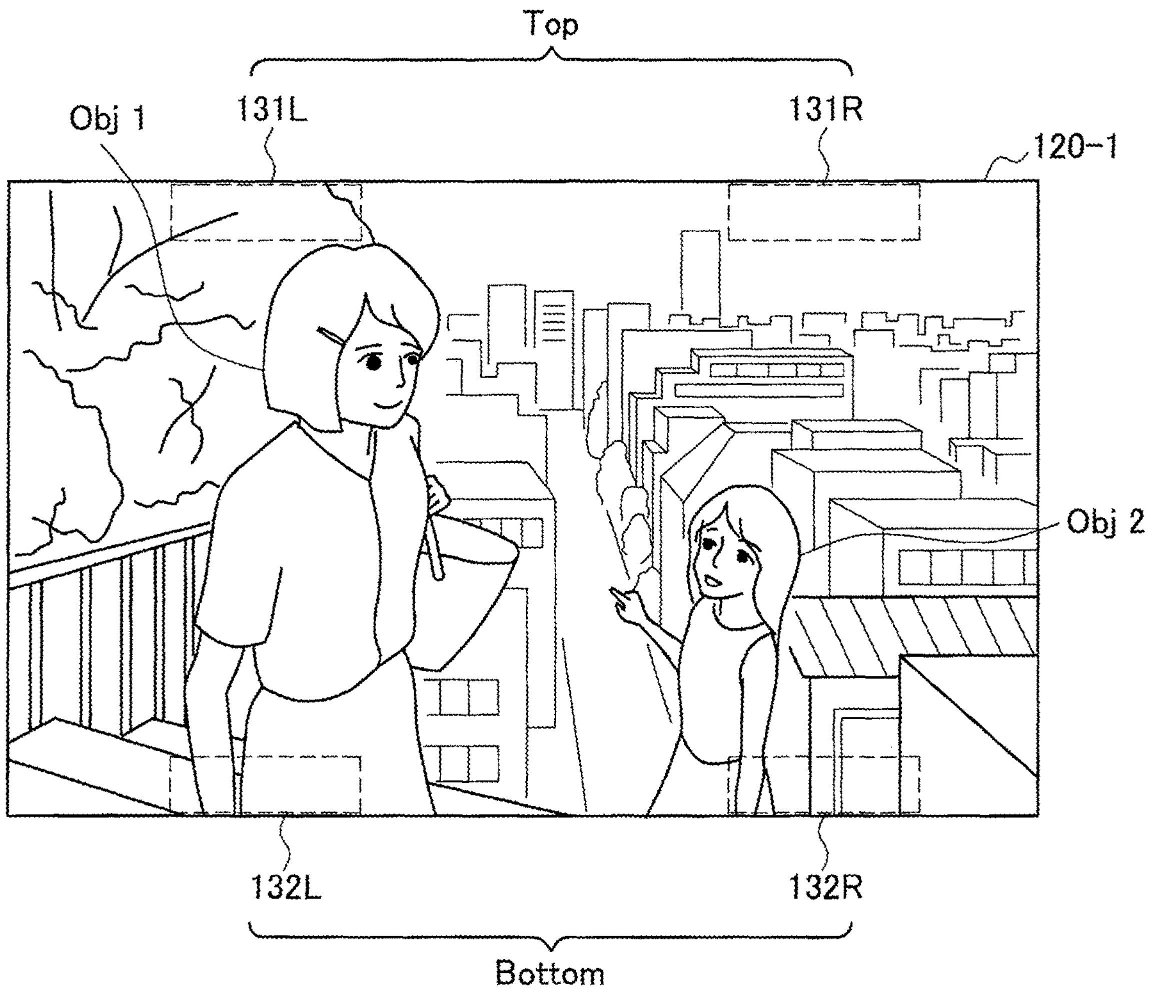
FIG. 6 is a view illustrating an adjustment of a positional relationship between an image and a sound according to a first example.

FIG. 6 is a view illustrating an adjustment of a positional relationship between an image and a sound according to a first example. As illustrated in FIG. 6, in the present example, the image displayed on the display unit 120-1 is analyzed to recognize an object 1 (person 1) and an object 2 (person 2), and the sound source position is specified based on the movement or the like of each object. Next, the voice signals to be output to the speakers (the upper speaker 131L, the upper speaker 131R, the lower speaker 132L, and the upper speaker 131R) are processed, respectively, so that the corresponding (synchronized) voice is heard from a direction of the specified sound source position (see FIG. 5). Note that, in a case where a plurality of sound sources are included in the voice signal (such as a speech voice and sound effects), signal processing may be separately performed for each sound source.

Specifically, in the case of a speech voice in which the object 1 (person 1) illustrated in FIG. 6 is the sound source position, each voice signal is processed so as to have a higher sound pressure, emphasize a higher frequency sound range, and reach the viewer's ear earlier as the voice signal is output to the speaker closer to a display position (the sound source position) of the mouth (or the face or the like) of the object 1. That is, when a voice signal to be output to the upper speaker 131L is ToP; L signal, a voice signal to be output to the upper speaker 131R is ToP; R signal, a voice signal to be output to the lower speaker 132L is Bottom; L signal, and a voice signal to be output to the lower speaker 132R is Bottom; R signal, each voice signal is adjusted as follows. How much difference is provided to each voice signal can be determined based on a positional relationship with the sound source position, a preset parameter, an upper limit, and a lower limit.

When the mouth of the object 1 is the sound source position

Sound pressure level and high frequency sound range emphasis

Top; L signal>Top; R signal≥Bottom; L signal>Bottom; R signal (Top; R signal and Bottom; L signal may be either on the upper side or the same)

Magnitude of delay (delay amount of reproduction timing)

Bottom; R signal>Bottom; L signal≥Top; R signal>Top; L signal

Similarly, a case of a speech voice in which the object 2 (person 2) illustrated in FIG. 6 is the sound source position is as follows.

When the mouth of the object 2 is the sound source position

Sound pressure level and high frequency sound range emphasis

Bottom; R signal>Top; R signal≥Bottom; L signal>Top; L signal

Magnitude of delay

Top; L signal>Top; R signal≥Bottom; L signal>Bottom; R signal

Figure 7:
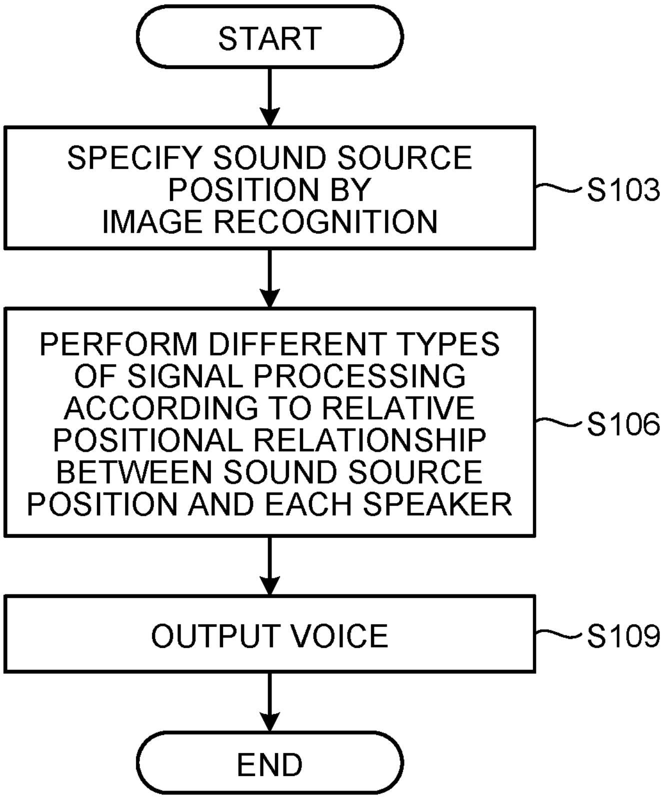
FIG. 7 is a flowchart illustrating an example of a flow of voice output processing according to the first example.

FIG. 7 is a flowchart illustrating an example of a flow of voice output processing according to the first example.

As illustrated in FIG. 7, first, the sound source position specifying unit 111 specifies the sound source position by image recognition (step S103).

Next, the signal processing unit 112 performs different types of signal processing on the voice signal to be output to each speaker so as to be localized at the sound source position in a pseudo manner, according to the relative positional relationship between the specified sound source position and each speaker (step S106).

Then, the control unit 110 outputs the processed voice signal to each speaker to output the voice (step S109).

2-2. Second Example

A second example is a diagram illustrating processing of a voice signal to be output to each speaker when using a flat speaker.

Figure 8:
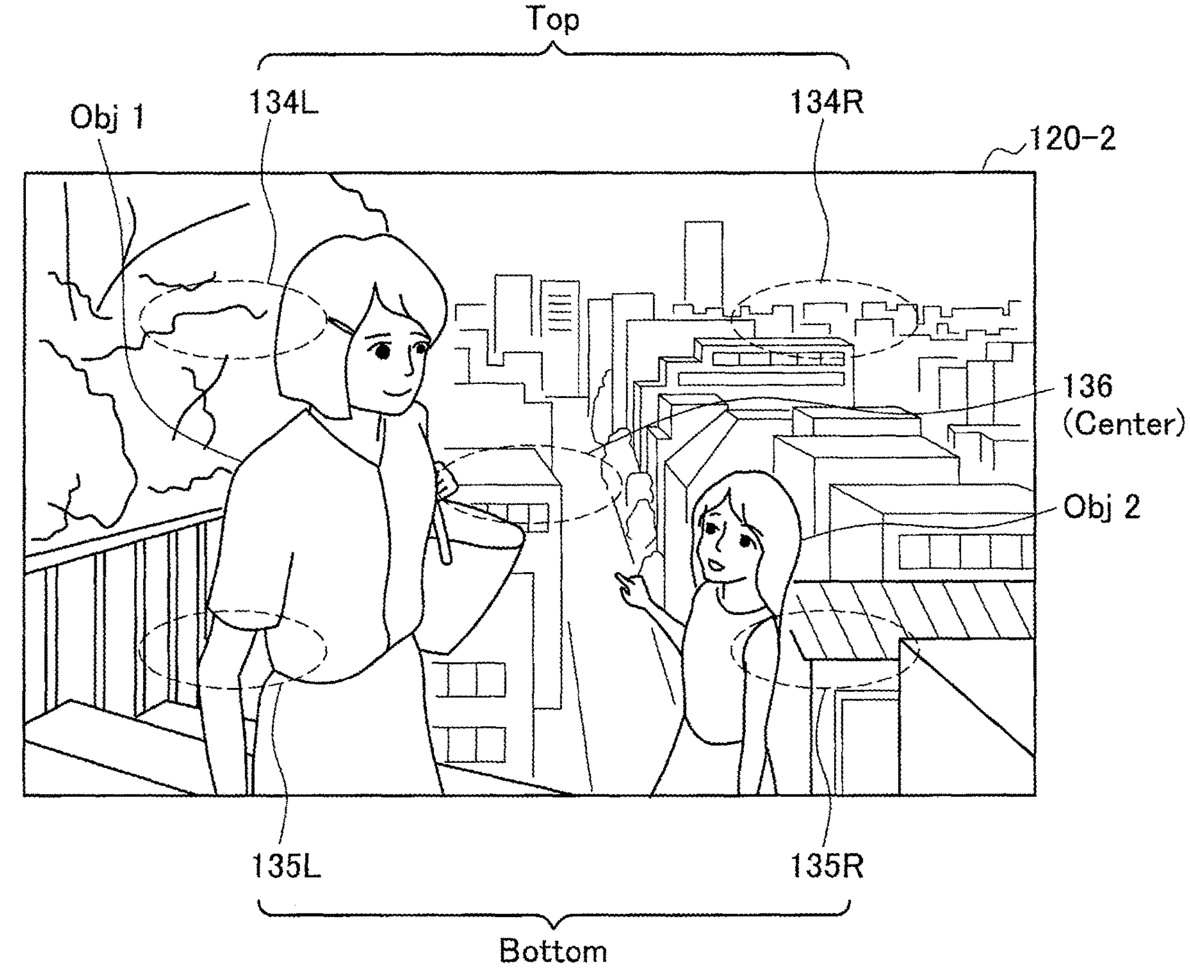
FIG. 8 is a view illustrating an adjustment of a positional relationship between an image and a sound according to a second example.

FIG. 8 is a view illustrating an adjustment of a positional relationship between an image and a sound according to a second example. A display unit 120-2 illustrated in FIG. 8 is realized by a flat panel speaker, a plurality of vibrators 134, 135, and 136 are provided on a rear surface of a flat panel constituted by a display cell, and the vibrators 134, 135, and 136 vibrate the flat panel to generate acoustic waves forward from the flat panel.

Since the flat panel speaker generates the acoustic waves forward from a flat panel surface by the vibration of the flat panel, a sound quality can be stabilized without providing a part of the flat panel speaker protruding from a lower end or an upper end of the speaker (the acoustic generating element) as illustrated in FIG. 3.

Therefore, for example, upper vibrators 134L and 134R and lower vibrators 135L and 135R may be installed slightly above the center and slightly below the center, respectively, and a center vibrator 136 may be installed at the center, as illustrated in FIG. 8.

As in the first example, even in the flat panel speaker, the signal processing unit 112 analyzes the image displayed on a display unit 120-2 to recognize the object 1 (person 1) and the object 2 (person 2), and specifies the sound source position based on the movement or the like of each object. Next, the voice signals to be output to the vibrators (the upper vibrator 134L, the upper vibrator 134R, the lower vibrator 135L, the lower vibrator 135R, and the center vibrator 136) are processed, respectively, so that the corresponding voice is heard from a direction of the specified sound source position.

Figure 9:
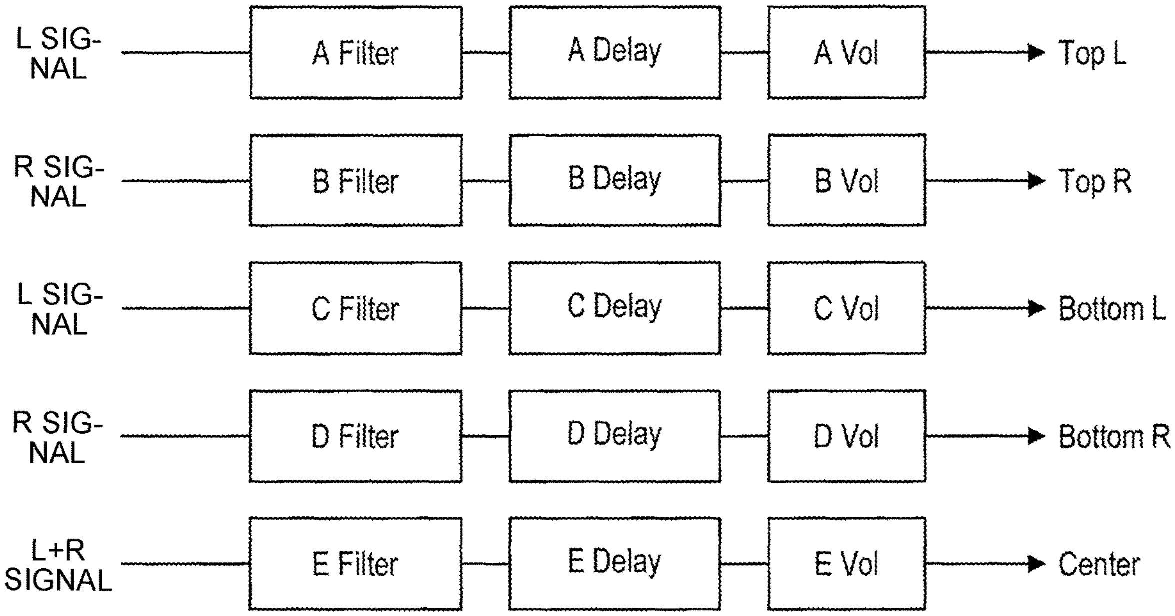
FIG. 9 is a diagram illustrating signal processing according to the second example.

FIG. 9 is a diagram illustrating signal processing according to a second example. As illustrated in FIG. 9, the signal processing unit 112 performs different types of signal processing according to the sound source position, and then outputs a voice signal to each vibrator. Specifically, a description thereof is as follows. Here, the upper vibrator 134L is referred to as Top; L, the upper vibrator 134R is referred to as Top; R, the lower vibrator 135L is referred to as Bottom; L, the lower vibrator 135R is referred to as Bottom; R, and the center vibrator 136 is referred to as Center.

When the mouth of the object 1 is the sound source position
output is performed only by Top; L, or
when output is performed by both Top; L and Center, the signal processing is performed so that the level of the sound pressure and the height of the sound range are set to Top; L>Center, and the magnitude of the delay is set to Center>Top; L.

When the mouth of the object 2 is the sound source position
output is performed only by Bottom; L, or
when output is performed by both Bottom; L and Center, the signal processing is performed so that the level of the sound pressure and the height of the sound range are set to Bottom; L>Center, and the magnitude of the delay is set to Center>Bottom; L.

2-3. Third Example

Furthermore, the display device 10 may recognize a positional relationship of a viewer with respect to the display device 10 (a distance of the face from the display device 10, a height from the floor, and the like) with a camera, and perform the signal processing so as to be aligned with an optimum sound image localization position.

Figure 10:
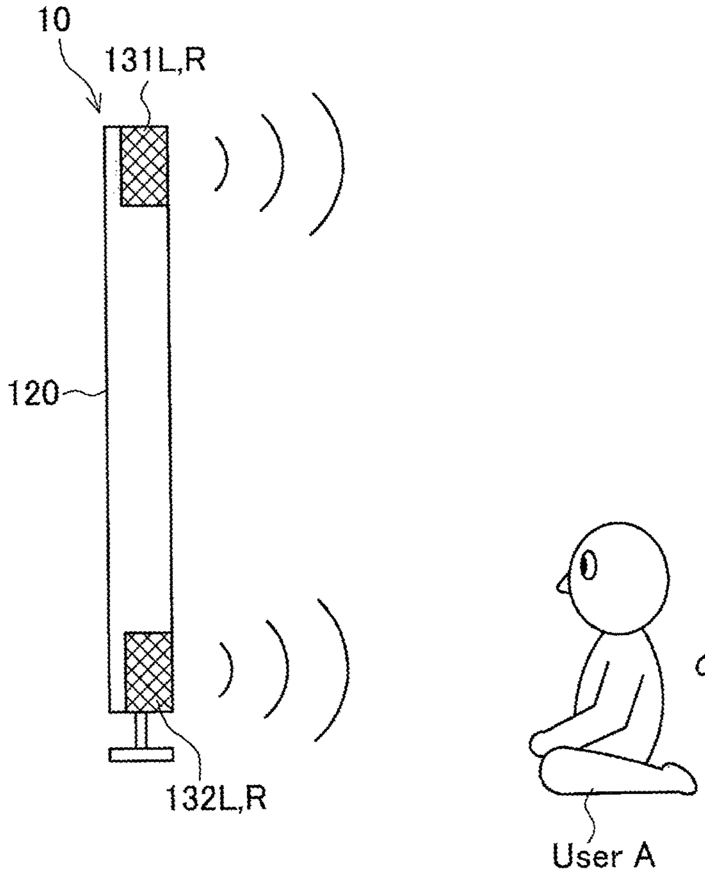
FIG. 10 is a view illustrating a positional relationship between the display device and a viewer according to a third example.

FIG. 10 is a view illustrating a positional relationship between the display device 10 and a viewer according to a third example. As illustrated in FIG. 10, in a case where the viewer sits on the floor to view the display device 10, sits on a chair to view the display device, stands up to view the display device, or the like, the positions (heights) of the ear of the viewer are different, and thus distances between the viewer and the upper speakers 131L and 131R or the lower speakers 132L and 132R are different. Generally, since it is easy to feel a sound nearby if the viewer is close to a sound source, the signal processing unit 112 realizes the optimum sound image localization by weighting the adjustments of the signal processing in consideration of the height of the ear of the viewer when performing the first example or the second example described above.

For example, in a case where the viewer sits on the floor (the position of a user A) and is closer to the lower speakers 132L and 132R (Bottom; L, R) than the upper speakers 131L and 131R (Top; L, R), it is easy to feel the sound from the lower speakers 132L and 132R nearby. Therefore, the signal processing is corrected by weighting the level of the sound pressure and the height of the sound range to be Top; L, R>Bottom; L, R, or the magnitude of delay to be Bottom; L, R>Top; L, R. Note that each L/R can be appropriately selected depending on whether the user is located more to the left of the display device 10 (closer to the speakers of L) or more to the right of the display device 10 (closer to the speakers of R).

Further, in a case where the viewer sits on the chair (the position of a user B) and distances between the upper speakers 131L and 131R (Top; L, R) and the lower speakers 132L and 132R (Bottom; L, R) are almost the same, since the proximity of the sound source position is equivalent, correction of the weighting or the like is not necessarily performed. However, in a case where the user is located more to the left of the display device 10 (closer to the speakers of L) or more to the right of the display device 10 (closer to the speakers of R), it is easy to feel a sound generated from the closer side nearby, and thus, weighting may be appropriately performed. Specifically, in a case where the viewer is more to the right, the weighting is performed so that the level of the sound pressure and the height of the sound range are set to Top; L>Top; R and Bottom; L>Bottom; R, and the magnitude of delay is set to Top; R, Bottom; R>Top; L, Bottom; L.

Furthermore, in a case where the viewer stands (the position of a user C) and is closer to the upper speakers 131L and 131R (Top; L, R) than the lower speakers 132L and 132R (Bottom; L, R), it is easy to feel the sound from the upper speakers 131L and 131R nearby. Therefore, the signal processing is corrected by weighting the level of the sound pressure and the height of the sound range to be Bottom; L, R>Top; L, R, or the magnitude of delay to be Top; L, R>Bottom; L, R. Note that each L/R can be appropriately selected depending on whether the user is located more to the left of the display device 10 (closer to the speakers of L) or more to the right of the display device 10 (closer to the speakers of R).

2-4. Fourth Example

In addition to the L and R signals (an L channel signal and an R channel signal), a Hight signal, which is a sound source in a height direction, that constructs a stereoscopic acoustic space and enables reproduction of movement of a sound source in accordance with an image, may be added to the voice signal. As illustrated in FIGS. 2 and 3 or 8, the display device 10 according to the present embodiment has a structure including a pair of acoustic reproducing elements on the upper side. Therefore, when such a Hight signal is reproduced, it is possible to reproduce a real sound to which a height component is added by synthesizing and outputting the Hight signal from an upper acoustic reproducing element (upper speakers 131L and 131R and upper vibrators 134L and 134R) without separately providing a dedicated speaker. The signal processing in this case is illustrated in FIG. 11.

Figure 11:
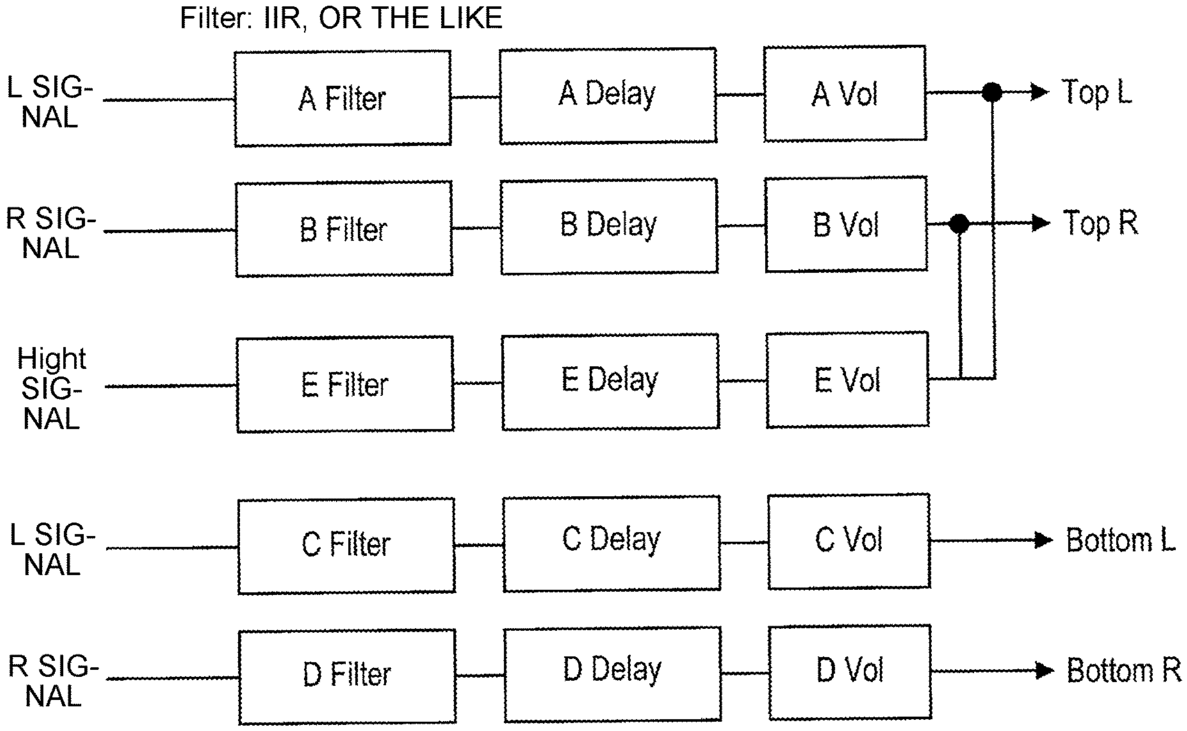
FIG. 11 is a diagram illustrating signal processing according to a fourth example.

FIG. 11 is a diagram illustrating signal processing according to a fourth example. As illustrated in FIG. 11, signal processing is appropriately performed on the Hight signal, and the Hight signal is added to the L signal and the R signal to be output to Top; L, R, respectively.

3. CONCLUSION

Although the preferred embodiment of the present disclosure has been described in detail with reference to the accompanying drawings, the present technology is not limited to the examples. It is obvious that a person skilled in the art may find various alterations and modifications within the scope of the appended claims, and it should be understood that they will naturally come under the technical scope of the present disclosure.

For example, although the structure in which the plurality of sets of speaker units are provided on the lower end and the upper end has been mainly described, the present disclosure is not limited to this, and a pair of speaker units may be further provided at both ends, and the disposition of the speaker units at the lower end and the upper end is not limited to the examples illustrated in the drawings. In any disposition, the display device 10 can process the voice signal to be output to each speaker according to the positional relationship between the sound source position obtained by analyzing the image and each speaker, and realize pseudo sound image localization.

Further, in a case where the sound source position is not in a screen, signal processing for perceiving the center of the screen, the outside of the screen, or the like as the sound source position may be performed according to the sound. For example, a sound such as back ground music (BGM) may use the center of the screen as the sound source position, or a sound of an airplane flying from the upper left of the screen outside the screen may use the upper left of the screen as the sound source position (for example, vibration processing may be performed so that the sound can be heard from the speaker located at the upper left of the screen).

Further, the processing of the voice signal output from each speaker can be seamlessly controlled according to the movement of the sound source position.

Further, in addition to the plurality of sets of speaker units, one or more subwoofer responsible for low-sound reproduction (a woofer (WF)) (compensating for a low sound range that is not sufficient with the plurality of sets of speaker units) may be provided. For example, the subwoofer may be applied to the configuration illustrated in FIG. 2 or the configuration illustrated in FIG. 8. As in this case, the voice signal to be output to each speaker can be processed to perform pseudo sound source localization according to the positional relationship between a sound source position specified from the image and each speaker (including the subwoofer).

Further, it is also possible to prepare a computer program for causing hardware such as a CPU, a ROM, and a RAM built in the above-described display device 10 to exhibit a function of the display device 10. In addition, a computer-readable storage medium storing the computer program is also provided.

In addition, the effects described in the present specification are merely illustrative and demonstrative, and not limitative. In other words, the technology according to the present disclosure can exhibit other effects that are evident to those skilled in the art along with or instead of the effects based on the present specification.

Note that the present technology can also have the following configurations.

(1)

A display device comprising: a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit.

(2)

The display device according to (1), wherein the control unit performs the signal processing according to a relative positional relationship of each speaker unit with respect to the sound source position.

(3)

The display device according to (2), wherein the control unit performs the signal processing in further consideration of at least a function or an environment of each speaker unit.

(4)

The display device according to any one of (1) to (3), wherein the control unit performs sound image localization processing corresponding to the sound source position by performing at least one of correction of a frequency band, an adjustment of a sound pressure, or delay processing of reproduction timing on the voice signal.

(5)

The display device according to any one of (1) to (4), wherein the control unit performs the signal processing for emphasizing a high frequency sound range component of the voice signal as the speaker unit is closer to the sound source position.

(6)

The display device according to any one of (1) to (5), wherein the control unit performs the signal processing for increasing the sound pressure of the voice signal as the speaker unit is closer to the sound source position.

(7)

The display device according to any one of (1) to (6), wherein the control unit increases a delay amount of the reproduction timing of the voice signal as the speaker unit is farther from the sound source position.

(8)

The display device according to any one of (1) to (7), wherein the display device includes a plurality of sets of two speakers reproducing voice signals of two left and right channels as the plurality of sets of speakers.

(9)

The display device according to (8), wherein the plurality of sets of speakers include a plurality of top speakers provided on an upper end of a rear surface of the display unit, and a plurality of bottom speakers provided on a lower end of the rear surface of the display unit.

(10)

The display device according to (8), wherein the display unit is a plate-shaped display panel, the speaker is a vibration unit vibrating the display panel to output a voice, the plurality of sets of speakers include a plurality of vibration units provided on an upper portion of a rear surface of the display panel, and a plurality of vibration units provided on a lower portion of the rear surface of the display panel, and the display device further includes a vibration unit provided at a center of the rear surface of the display panel.

(11)

A control method, by a processor including a control unit, comprising:

specifying a sound source position from an image displayed on a display unit, and performing different types of signal processing on a voice signal synchronized with the image according to the sound source position, the voice signal being output to a plurality of sets of speaker units, the plurality of sets of speaker units including at least one set of speaker units provided on an upper portion of the display unit.

(12)

A program causing a computer to function as:

a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit.

REFERENCE SIGNS LIST

10 DISPLAY DEVICE
110 CONTROL UNIT
111 SOUND SOURCE POSITION SPECIFYING UNIT
112 SIGNAL PROCESSING UNIT
120 DISPLAY UNIT
130 VOICE OUTPUT UNIT
131 (131L, 131R) UPPER SPEAKER (SPEAKER UNIT)
132 (132L, 132R) LOWER SPEAKER (SPEAKER UNIT)
134 (134L, 134R) UPPER VIBRATOR
135 (135L, 135R) LOWER VIBRATOR
136 CENTER VIBRATOR
140 TUNER
150 COMMUNICATION UNIT
160 REMOTE CONTROL RECEPTION UNIT
170 STORAGE UNIT
180 SLIT
182 SLIT

The invention claimed is:

1. A display device comprising: a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit, wherein the control unit is operable to perform signal processing comprising adjusting a high frequency sound range component of the voice signal as the speaker unit is closer to the sound source position and adjusting the voice signal based on a positional relationship between the display unit and a viewer of the display unit, the positional relationship comprising a distance between a face and the display unit, and wherein the control unit performs the signal processing in consideration of at least an environment of each speaker unit.

2. The display device according to claim 1, wherein the control unit performs the signal processing according to a relative positional relationship of each speaker unit with respect to the sound source position.

3. The display device according to claim 2, wherein the control unit performs the signal processing in further consideration of at least a function of each speaker unit.

4. The display device according to claim 1, wherein the control unit performs sound image localization processing corresponding to the sound source position by performing at least one of correction of a frequency band, an adjustment of a sound pressure, or delay processing of reproduction timing on the voice signal.

5. The display device according to claim 1, wherein the control unit performs the signal processing for increasing the sound pressure of the voice signal as the speaker unit is closer to the sound source position.

6. The display device according to claim 1, wherein the control unit increases a delay amount of the reproduction timing of the voice signal as the speaker unit is farther from the sound source position.

7. The display device according to claim 1, wherein the display device includes a plurality of sets of two speakers reproducing voice signals of two left and right channels as the plurality of sets of speakers.

8. The display device according to claim 7, wherein the plurality of sets of speakers include a plurality of top speakers provided on an upper end of a rear surface of the display unit, and a plurality of bottom speakers provided on a lower end of the rear surface of the display unit.

9. The display device according to claim 7, wherein the display unit is a plate-shaped display panel, the speaker is a vibration unit vibrating the display panel to output a voice, the plurality of sets of speakers include a plurality of vibration units provided on an upper portion of a rear surface of the display panel, and a plurality of vibration units provided on a lower portion of the rear surface of the display panel, and the display device further includes a vibration unit provided at a center of the rear surface of the display panel.

10. A control method, by a processor including a control unit, comprising:

specifying a sound source position from an image displayed on a display unit, and performing different types of signal processing on a voice signal synchronized with the image according to the sound source position, the voice signal being output to a plurality of sets of speaker units, the plurality of sets of speaker units including at least one set of speaker units provided on an upper portion of the display unit, wherein performing different types of signal processing comprises adjusting a high frequency sound range component of the voice signal as the speaker unit is closer to the sound source position and adjusting the voice signal based on a positional relationship between the display unit and a viewer of the display unit, the positional relationship comprising a distance between a face and the display unit, and wherein performing different types of signal processing comprises performing signal processing in consideration of at least an environment of each speaker unit.

11. A non-transitory computer-readable medium having stored thereon a program for causing a computer to function as:

a control unit that specifies a sound source position from an image displayed on a display unit, and performs different types of signal processing on a voice signal synchronized with the image according to the sound source position, the voice signal being output to a plurality of sets of speaker units, the plurality of sets of speaker units including at least one set of speaker units provided on an upper portion of the display unit, wherein the control unit is operable to perform signal processing comprising adjusting a high frequency sound range component of the voice signal as the speaker unit is closer to the sound source position and adjusting the voice signal based on a positional relationship between the display unit and a viewer of the display unit, the positional relationship comprising a distance between a face and the display unit, and wherein the control unit performs the signal processing in consideration of at least an environment of each speaker unit.

* * * * *